United States Patent
Ichimura et al.

(10) Patent No.: US 6,941,688 B2
(45) Date of Patent: Sep. 13, 2005

(54) HYDRAULICALLY POWERED VEHICLE, AND ENGINE ROTATIONAL SPEED CONTROL METHOD FOR HYDRAULICALLY POWERED VEHICLE

(75) Inventors: Kazuhiro Ichimura, Niihari (JP); Toshihiko Shinya, Noda (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 109 days.

(21) Appl. No.: 10/311,253
(22) PCT Filed: Oct. 22, 2001
(86) PCT No.: PCT/JP01/09254

§ 371 (c)(1),
(2), (4) Date: Dec. 13, 2002

(87) PCT Pub. No.: WO02/33239

PCT Pub. Date: Apr. 25, 2002

(65) Prior Publication Data

US 2003/0140530 A1   Jul. 31, 2003

(30) Foreign Application Priority Data

Oct. 20, 2000  (JP) ........................................ 2000-320761

(51) Int. Cl.$^7$ ................................................. E02F 5/02
(52) U.S. Cl. ........................... 37/348; 180/306; 60/490; 172/3
(58) Field of Search ........................ 37/348, 382; 172/2, 172/3, 10; 180/306, 305; 60/327, 459, 449, 490

(56) References Cited

U.S. PATENT DOCUMENTS

| | | | | |
|---|---|---|---|---|
| 5,277,269 A | * | 1/1994 | Ichimura et al. | 180/306 |
| 5,784,883 A | * | 7/1998 | Ohkura et al. | 60/327 |
| 5,911,506 A | * | 6/1999 | Nakamura et al. | 37/348 |
| 6,321,535 B2 | * | 11/2001 | Ikari et al. | 60/421 |
| 2004/0123499 A1 | * | 7/2004 | Arii | 37/348 |

FOREIGN PATENT DOCUMENTS

| | | | |
|---|---|---|---|
| JP | 8-158409 | * | 6/1996 |
| JP | 8-158410 | * | 6/1996 |
| JP | 9-71978 | * | 3/1997 |
| JP | 10-219753 | * | 8/1998 |
| JP | A 10-288058 | | 10/1998 |
| JP | A 2000-204979 | | 7/2000 |
| JP | A 2000-303872 | | 10/2000 |

* cited by examiner

Primary Examiner—Victor Batson
(74) Attorney, Agent, or Firm—Oliff & Berridge, PLC

(57) ABSTRACT

During idling control with an acceleration switch ON, operation of the accelerator pedal is stopped. When stoppage of the operation of the accelerator pedal is detected for a predetermined time period, along with closing a slowdown switch, an idling changeover switch is changed over to its contact a. And the engine rotational speed is gradually slowed down by a command from a slowdown control section. On the other hand, when stoppage of the operation of an operation lever is detected for a predetermined time period, the idling changeover switch is changed over to its contact c. Due to this, the engine rotational speed is instantly controlled to the idling rotational speed.

13 Claims, 14 Drawing Sheets

FIG. 8
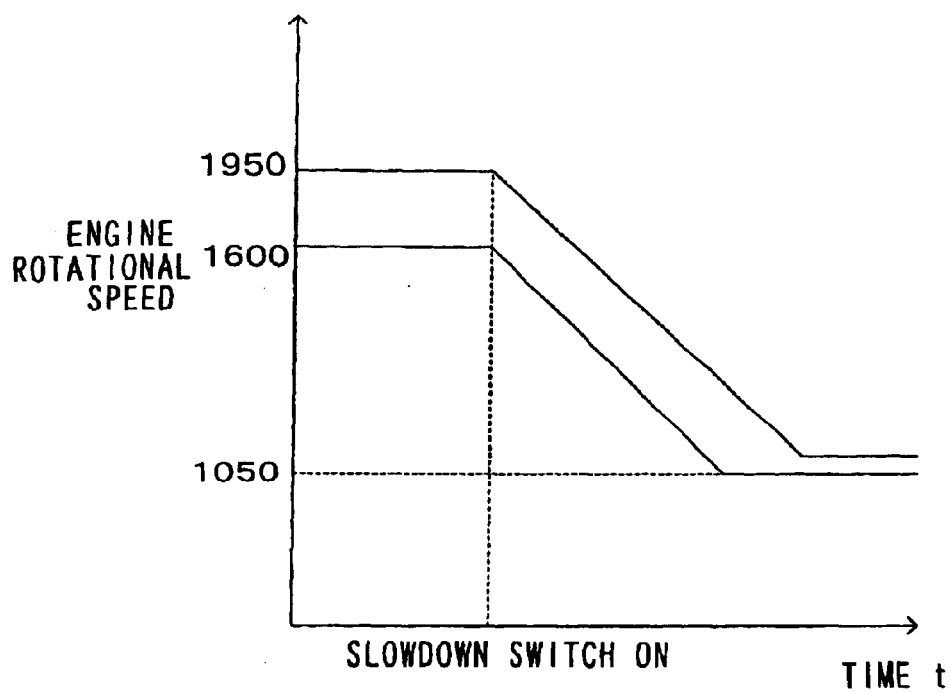
(a)
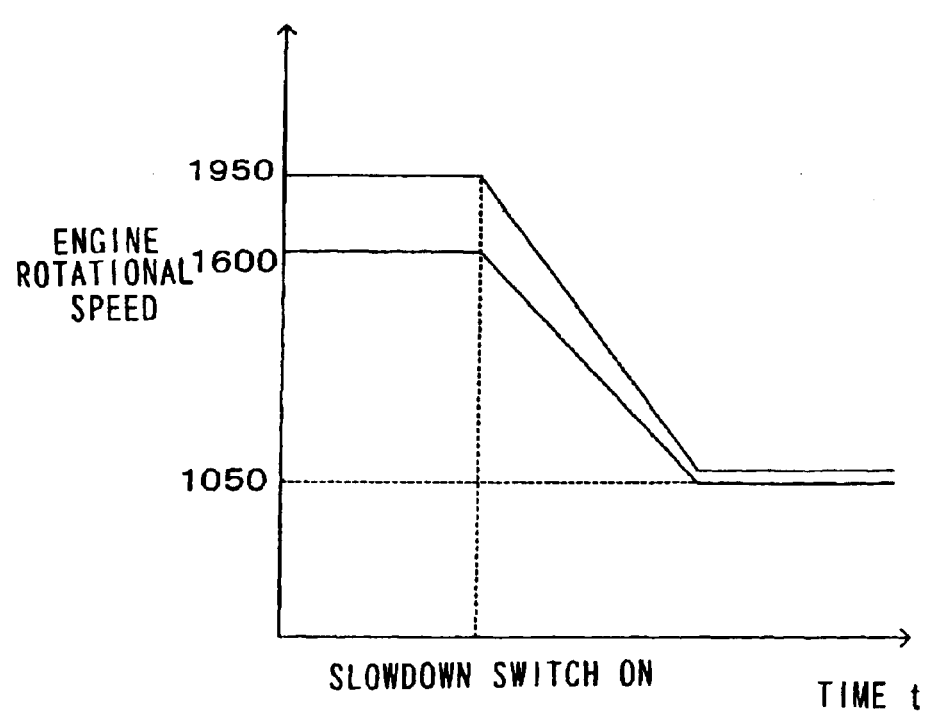
(b)

FIG. 11
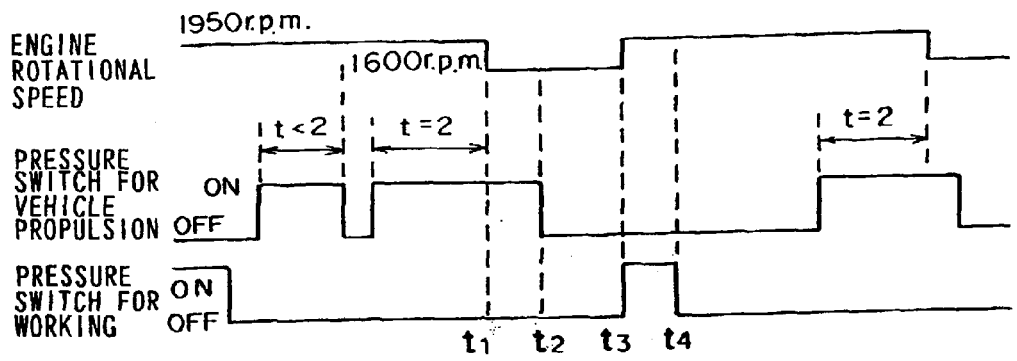
(a)
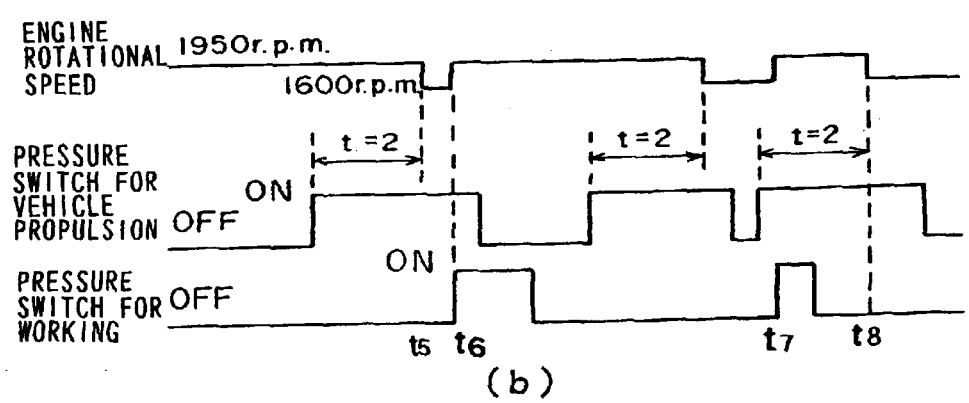
(b)
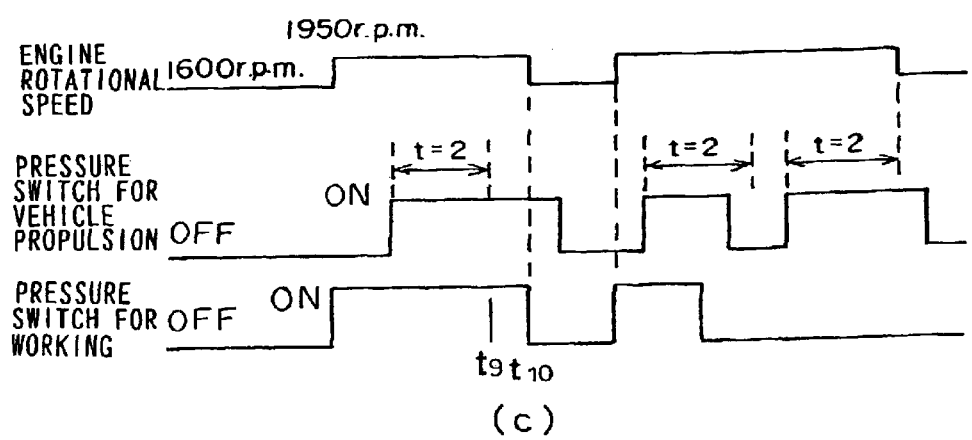
(c)

FIG. 13
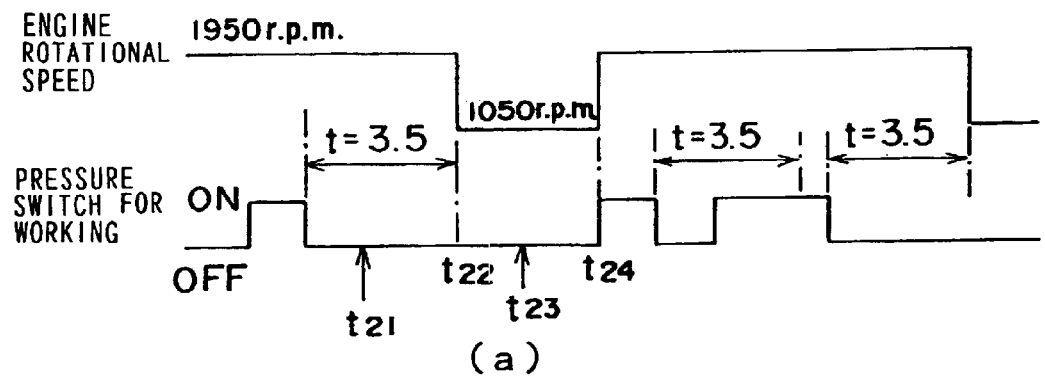
(a)
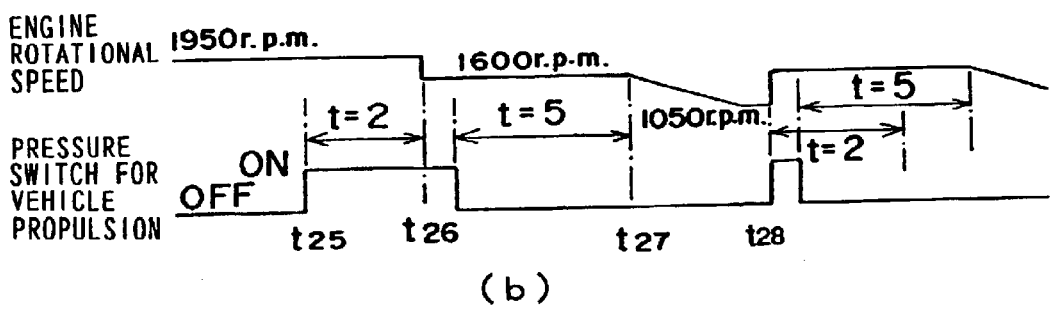
(b)
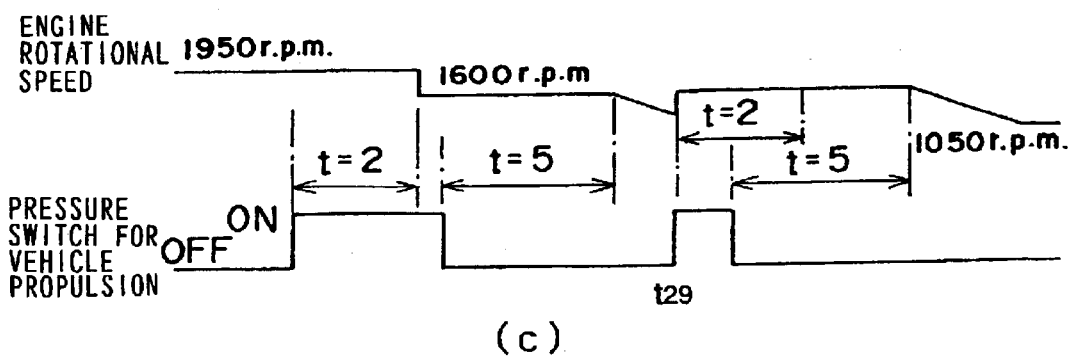
(c)

HYDRAULICALLY POWERED VEHICLE, AND ENGINE ROTATIONAL SPEED CONTROL METHOD FOR HYDRAULICALLY POWERED VEHICLE

The present application is based upon Japanese Patent Application 2000-320761 (filed Oct. 20, 2000), and the contents thereof are incorporated herein by reference.

1. Technical Field

The present invention relates to a hydraulically powered vehicle such as a wheel type hydraulic shovel, and to an engine rotational speed control method for a hydraulically powered vehicle.

2. Background Art

Generally, as vehicle speed adjustment methods for a hydraulically powered vehicle such as a wheel type hydraulic shovel, there are an accelerator pedal control method in which the engine rotational speed and a control valve are controlled according to the amount by which a driving pedal is stepped upon, and a valve control method in which, with a constant engine rotational speed, a control valve is controlled according to the amount by which the driving pedal is stepped upon. With the accelerator pedal control method, the rotational speed of the engine drops when the driving pedal has been released. On the other hand, with the valve control method, the engine rotational speed remains constant even if the driving pedal is released.

In order to economize fuel and reduce noise, it is desirable to keep the engine rotational speed as low as possible, except when required. In particular, with the valve control method, it is very necessary to reduce the engine rotational speed when the vehicle is not being propelled, since the engine rotational speed is not reduced even if the driving pedal is released. In this case, if the engine rotational speed is reduced abruptly down to the idling rotational speed for vehicle propulsion when the driving pedal has been released while the vehicle is being propelled, cavitation may be caused in the pressurized hydraulic fluid from the hydraulic pump which is being driven by the engine. Furthermore, when during working the operation lever of a front attachment has been released, great wastage is entailed with regard to fuel consumption and noise reduction by slow dropping of the engine rotational speed down to the idling rotational speed for working.

DISCLOSURE OF THE INVENTION

The objective of the present invention is to propose a hydraulically powered vehicle, and an engine rotational speed control method for a hydraulically powered vehicle, which are able suitably to reduce the engine rotational speed as far as the idling rotational speed.

In order to attain the above described objective, the hydraulically powered vehicle according to the present invention comprises: a hydraulic pump which is driven by an engine; a hydraulic motor for vehicle propulsion which is driven by pressurized hydraulic fluid discharged from the hydraulic pump; at least one hydraulic actuator for working which is driven by pressurized hydraulic fluid discharged from the hydraulic pump; an accelerator pedal which adjusts the rotational speed of the hydraulic motor for vehicle propulsion; an operation lever device which operates the hydraulic actuator for working; a rotational speed adjustment device which adjusts the rotational speed of the engine; and a rotational speed control device which controls the rotational speed adjustment device. And the rotational speed control device controls the rotational speed adjustment device so that upon transition from the vehicle propulsion state to the non-propulsion state, the rotational speed of the engine is reduced to an idling rotational speed for vehicle propulsion, and upon transition from the working state to the non-working state, the rotational speed of the engine is reduced to an idling rotational speed for working.

The rotational speed control device may desirably control the rotational speed adjustment device so that upon transition from the vehicle propulsion state to the non-propulsion state, the rotational speed of the engine is gradually reduced to the idling rotational speed for vehicle propulsion, and upon transition from the working state to the non-working state, the rotational speed of the engine is instantly reduced to the idling rotational speed for working.

Moreover, in order to attain the above-described objective, the hydraulically powered vehicle according to the present invention comprises: a hydraulic pump which is driven by an engine; a hydraulic motor for vehicle propulsion which is driven by pressurized hydraulic fluid discharged from the hydraulic pump; at least one hydraulic actuator for working which is driven by pressurized hydraulic fluid discharged from the hydraulic pump; an accelerator pedal which adjusts the rotational speed of the hydraulic motor for vehicle propulsion; an operation lever device which operates the hydraulic actuator for working; a state detection device which detects each of a first state in which both the accelerator pedal and the operation lever device are not being operated, a second state in which the accelerator pedal is being operated but the operation lever device is not being operated, and a third state in which the accelerator pedal is not being operated but the operation lever device is being operated; a rotational speed adjustment device which adjusts the rotational speed of the engine; and a rotational speed control device which controls the rotational speed adjustment device. And the rotational speed control device controls the rotational speed adjustment device so that when the first stated has been detected for a predetermined time period after transition from second state to the first state was detected by the stated detection device, the rotational speed of the engine is gradually reduced to an idling rotational speed for vehicle propulsion, and when the first state has been detected for a predetermined time period after transition from the third state to the first state was detected, the rotational speed of the engine is instantly reduced to an idling rotational speed for working.

The rotational speed control device may control the rotational speed adjustment device so that the rotational speed of the engine becomes constant irrespective of the amount of operation of the accelerator pedal, and may also control the amount of pressurized hydraulic fluid which is supplied to the hydraulic motor for vehicle propulsion based upon the amount of operation of the accelerator pedal.

It is desirable to further comprise an idling switch which commands idling rotational speed control by the rotational speed control device, with the rotational speed control device performing the idling rotational speed control when a command has been outputted by the idling switch. When no command is being outputted by the idling switch, the rotational speed control device may control the rotational speed adjustment device so that the rotational speed of the engine varies between a predetermined maximum rotational speed during vehicle propulsion or a predetermined maximum rotational speed during working, and a predetermined minimum rotational speed, based upon the operational state of the accelerator pedal and the operational state of the operation lever device.

It is desirable that the rotational speed adjustment device comprises an operation member which is provided within a driving compartment, and an actuator which adjusts the rotational speed of the engine according to a signal from the rotational speed control device.

The predetermined time period for determining to reduce the rotational speed of the engine to the idling rotational speed for vehicle propulsion, may be longer than the predetermined time period for determining to reduce the rotational speed of the engine to the idling rotational speed for working.

Furthermore, the present invention can also be used in an engine rotational speed control method for a hydraulically powered vehicle which comprises: a hydraulic pump which is driven by an engine; a hydraulic motor for vehicle propulsion which is driven by pressurized hydraulic fluid discharged from the hydraulic pump; at least one hydraulic actuator for working which is driven by pressurized hydraulic fluid discharged from the hydraulic pump; an accelerator pedal which adjusts the rotational speed of the hydraulic motor for vehicle propulsion; an operation lever device which operates the hydraulic actuator for working; a rotational speed adjustment device which adjusts the rotational speed of the engine; and a rotational speed control device which controls the rotational speed adjustment device. In order to achieve the above-described objective, upon transition from the vehicle propulsion state to the non-propulsion state, the rotational speed of the engine is gradually reduced to an idling rotational speed for vehicle propulsion, and upon transition from the working state to the non-working state, the rotational speed of the engine is instantly reduced to an idling rotational speed for working.

As has been described above, the hydraulically powered vehicle and the engine rotational speed control method for a hydraulically powered vehicle according to the present invention reduce the rotational speed of the engine to an idling rotational speed for vehicle propulsion when the hydraulically powered vehicle transits from the propulsion state to the non-propulsion state, and also reduce the rotational speed of the engine to an idling rotational speed for working when the hydraulically powered vehicle transits from the working state to the non-working state. Therefore, it is possible to economize on fuel and to reduce noise. Furthermore, when the hydraulically powered vehicle transits from the propulsion state to the non-propulsion state, the rotational speed of the engine is gradually reduced to the idling rotational speed for vehicle propulsion. Therefore, it is possible to prevent cavitation from being generated when vehicle propulsion is terminated. Yet further, when the hydraulically powered vehicle transits from the working state to the non-working state, the rotational speed of the engine is instantly reduced to the idling rotational speed for working. Accordingly, it is possible to economize on fuel and effectively to reduce noise when working is terminated.

BRIEF DESCRIPTION OF THE DRAWINGS

FIGS. 8A and 8B are diagrams showing a characteristic for engine rotational speed slowdown.

FIGS. 11A–11C are time charts explaining the operation of the control circuit.

FIGS. 13A–13C are time charts explaining the operation of the control circuit.

BEST MODE FOR CARRYING OUT THE INVENTION

The present invention will be explained in the case of its application to a wheel type hydraulic shovel, using FIGS. 1 through 12. This wheel type hydraulic shovel comprises a wheel type traveling body, a swiveling body which is linked upon the traveling body so as to be rotatable thereupon, and an attachment for working which is fitted to the swiveling body.

Figure 1:
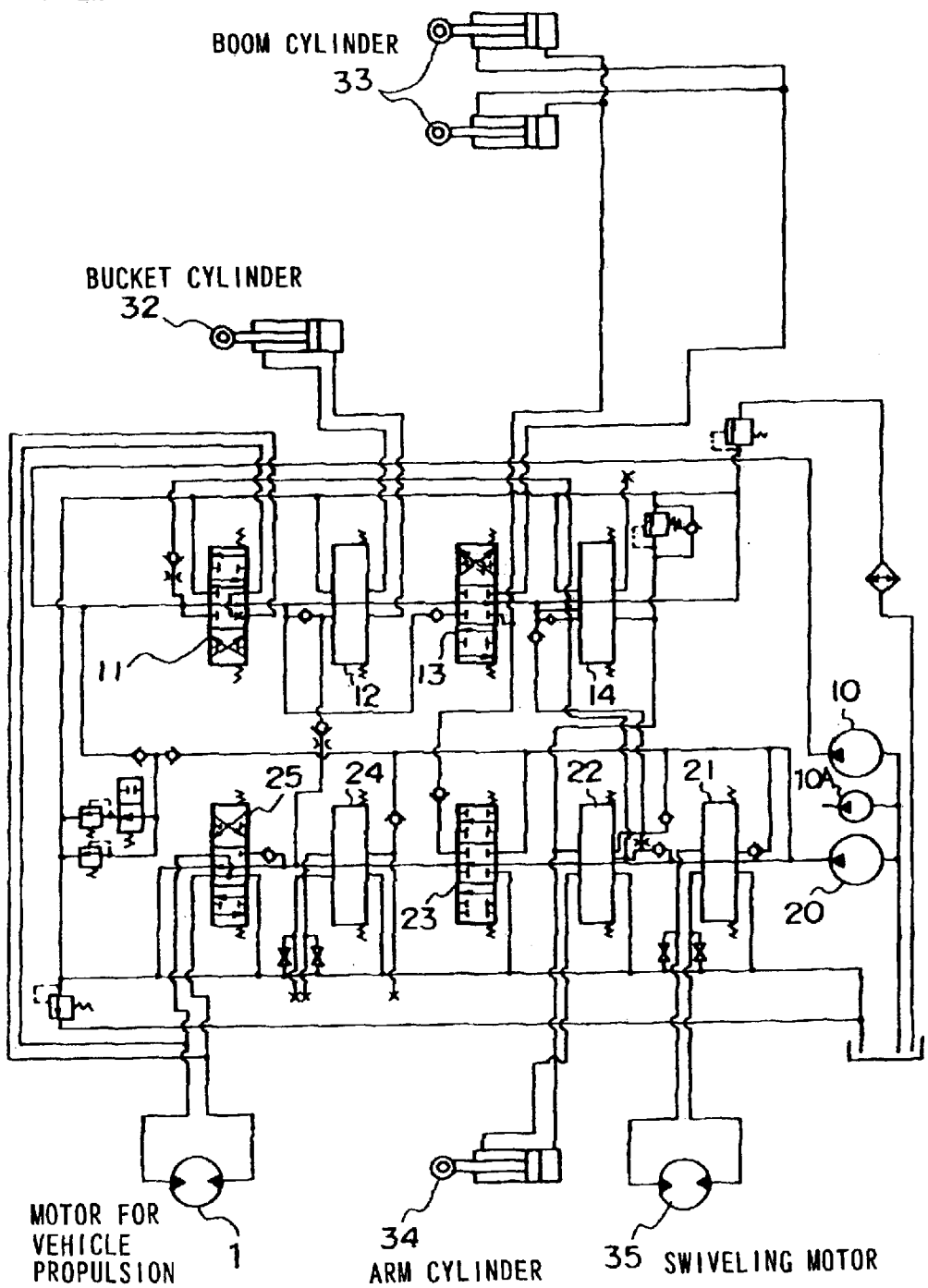
FIG. 1 is a hydraulic circuit diagram of a wheel type hydraulic shovel according to the present invention.

FIG. 1 is a hydraulic circuit of a wheel type hydraulic shovel according to the present invention. This hydraulic circuit comprises main pumps 10 and 20 which are driven by an engine not shown in the figure, four control valves 11 through 14 which are arranged in series with respect to the main pump 10, and five control valves 21 through 25 which are arranged in series with respect to the main pump 20. The hydraulic circuit further comprises a propulsion motor 1 which is driven by pressurized hydraulic fluid controlled by the control valves 11 and 25, a bucket cylinder 32 which is driven by pressurized hydraulic fluid controlled by the control valve 12, a boom cylinder 33 which is driven by pressurized hydraulic fluid controlled by the control valves 13 and 23, an arm cylinder 34 which is driven by pressurized hydraulic fluid controlled by the control valves 14 and 22, and a swiveling motor 35 which is driven by pressurized hydraulic fluid controlled by the control valve 21. The control valve 24 is a reserve control valve.

The propulsion motor 1, the boom cylinder 33, and the arm cylinder 34 are driven by a merge circuit which merges the pressurized hydraulic fluid from the main pumps 10 and 20 so as to increase operational speed. A pilot pump 10A supplies pilot pressurized hydraulic fluid to a pilot circuit which will be described hereinafter, and also supplies it to a detection circuit (FIG. 5) for detecting operation/non-operation of an accelerator pedal and operation/non-operation of operation levers which will be described hereinafter.

Figure 2:
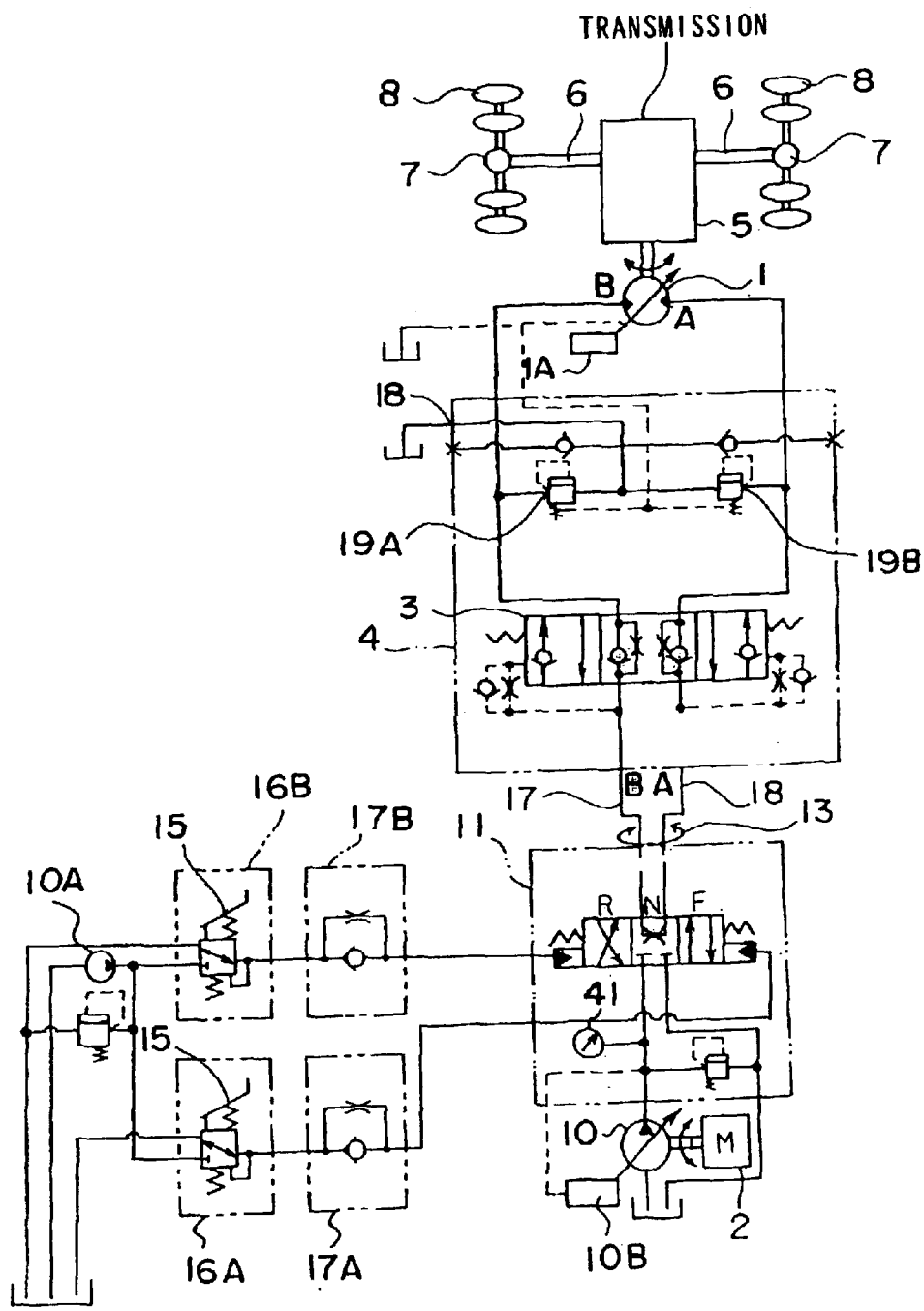
FIG. 2 is a figure showing the details of a vehicle propulsion hydraulic circuit of FIG. 1.

FIG. 2 is a figure showing the details of a vehicle propulsion hydraulic circuit shown in FIG. 1. It should be understood that FIG. 2 shows the one of the main pumps 10 and the control valve 11 for vehicle propulsion of the vehicle propulsion hydraulic circuit in FIG. 1. As shown in FIG. 2, the direction and the flow amount of the hydraulic fluid discharged from the variable displacement type main pump 10 which is driven by the engine 2 are controlled by the control valve 11, and the hydraulic fluid is supplied to the variable displacement type propulsion motor 1 via a brake valve 4 which includes a built-in counterbalance valve 3. The rotation of the propulsion motor 1 is changed in its speed by a transmission 5. The rotation of the propulsion motor 1 which has been changed is transmitted to tires 8 via propeller shafts 6 and axles 7, and propels the wheel type hydraulic shovel. A pressure sensor 41 is provided in a line between the main pump 10 and the control valve 11. The pressure sensor 41 detects the pump hydraulic pressure of the main pump 10 as a vehicle propulsion drive pressure (a motor drive pressure). The transmission ratio of the transmission 5 is set to either a low speed range or a high-speed range by operation of a lever not shown in the figure.

Figure 3:
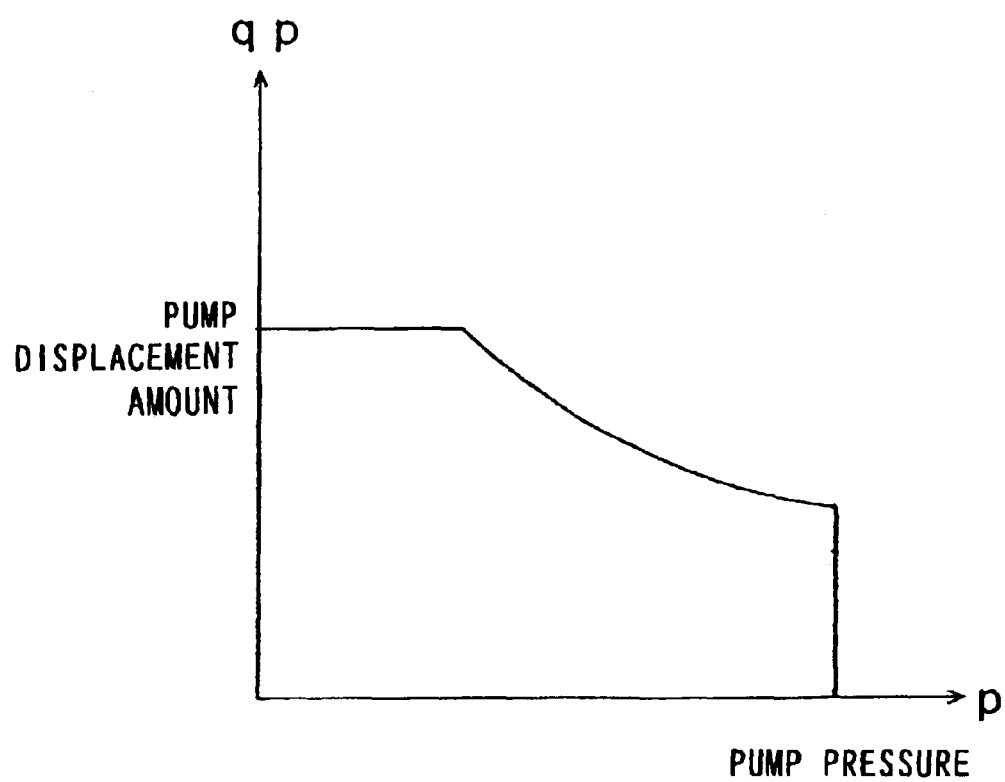
FIG. 3 is a P-qp graph for a variable displacement pump of FIG. 2.

The displacement amount of the main pump 10 is adjusted by a pump regulator 10B. The pump regulator 10B is provided with a torque limitation section. The pump output hydraulic pressure is fed back to this torque limitation section, and horsepower control is performed. FIG. 3 shows the characteristic (a P-qp graph) of the pump hydraulic pressure P and the displacement amount qp of the main pump 10. The horsepower control is performed based upon a P-qp graph as shown in FIG. 3. The displacement amount qp of the main pump 10 is controlled by the regulator 10B so that the load which is determined according to the pump output hydraulic pressure P and the pump displacement amount qp does not exceed the engine output. In other words, when the above-described feedback hydraulic pressure P is fed to the regulator 10B, the pump displacement amount qp is controlled following the P-qp graph shown in FIG. 3.

It should be understood that in this embodiment of the present invention the maximum rotational speed for vehicle propulsion, the rotational speed for high-horsepower-vehicle-propulsion (or vehicle propulsion requiring high power), and the maximum rotational speed for working are respectively controlled to 1600 rpm, to 2150 rpm, and to 1950 rpm, as will be described hereinafter.

The displacement amount of the propulsion motor 1 is adjusted by a regulator 1A. The regulator 1A is constructed so that a pilot pressure corresponding to motor drive pressure is acted thereupon. Accordingly, the motor displacement amount qm is, for example, changed over between two levels, a low level and a high level. In other words, when the motor drive pressure becomes a predetermined value P1 or greater, a pilot pressure which is higher than the predetermined value acts upon the regulator 1A, and the motor displacement amount qm is set to a maximum. Furthermore, at a motor drive pressure less than the predetermined value P1, the motor displacement amount qm is set to a minimum.

The pilot circuit comprises a pilot pump 10A and a pair of propulsion pilot valves 16A and 16B which generate pilot secondary hydraulic pressures corresponding to depression of an accelerator pedal 15. Furthermore, the circuit comprises a pair of slow return valves 17A and 17B, following the pilot valves 16A and 16B, which delay the return of hydraulic fluid to the pilot valves 16A and 16B.

The accelerator pedal 15 can be rotationally moved either in a forward direction or a rearward direction by, respectively, being stepped on forward (forward depressed), or being stepped on rearward (rearward depressed). The pilot valve 16A is driven by the forward depression of the accelerator pedal 15, and the pilot valve 16B is driven by its rearward depression. Due to this, the pilot pressure from the pilot circuit acts upon pilot ports of the control valve 11. The control valve 11 is changed over by the pilot pressure to a F position or a R position. As a result, the pressurized hydraulic fluid from the main pump 10 acts upon the propulsion motor 1, the propulsion motor 1 rotates at a speed corresponding to the amount of pedal operation, and the vehicle is propelled. It should be understood that, in this embodiment, the vehicle speed is adjusted by so called valve control that controls the opening amount of the control valve 11 according to the amount of operation of the accelerator pedal 15, but not by so called accelerator pedal control that changes the engine rotational speed according to the amount of operation of the accelerator pedal 15. With the valve control method, it is not necessary for a sensor or the like to detect the pilot pressure from the accelerator pedal 15.

When, during vehicle propulsion by forward depression of the accelerator pedal 15, the pedal operation is ceased, the propulsion pilot valve 16A interrupts the pressurized hydraulic fluid from the pilot pump 10A, and an outlet port of the propulsion pilot valve 16A is connected to the reservoir. The pressurized hydraulic fluid which had acted upon the pilot port of the control valve 11 returns to the reservoir via the slow return valve 17A and the propulsion pilot valve 16A. At this time the control valve 11 gradually switches over to its neutral position, because the returning hydraulic fluid is restricted by the restrictor of the slow return valve 17A. When the control valve 11 has switched over to its neutral position, the hydraulic fluid discharged from the main pump 10 returns to the reservoir. The supply of pressurized driving hydraulic fluid to the propulsion motor 1 is interrupted, and the counterbalance valve 3 also switches over to its neutral position shown in the figure.

In this case, the vehicle continues to move due to its inertia. The propulsion motor 1 changes over from motor operation to pump operation, and its B port side in the figure starts to suck in hydraulic fluid, while its A port side starts to discharge hydraulic fluid. The pressurized hydraulic fluid from the propulsion motor 1 is restricted by restrictors at the neutral position of the counterbalance valve 3 (the neutral restrictors). Therefore, the pressure of the pressurized hydraulic fluid between the counterbalance valve 3 and the propulsion motor 1 increases and acts as a brake pressure upon the propulsion motor 1. As a result, the propulsion motor 1 generates braking torque and brakes the vehicle. If the amount of hydraulic fluid sucked in during the pump operation is insufficient, the amount of hydraulic fluid to the propulsion motor 1 is supplemented through a makeup port 18. The brake pressure is limited to its maximum pressure by relief valves 19A and 19B.

Figure 4:
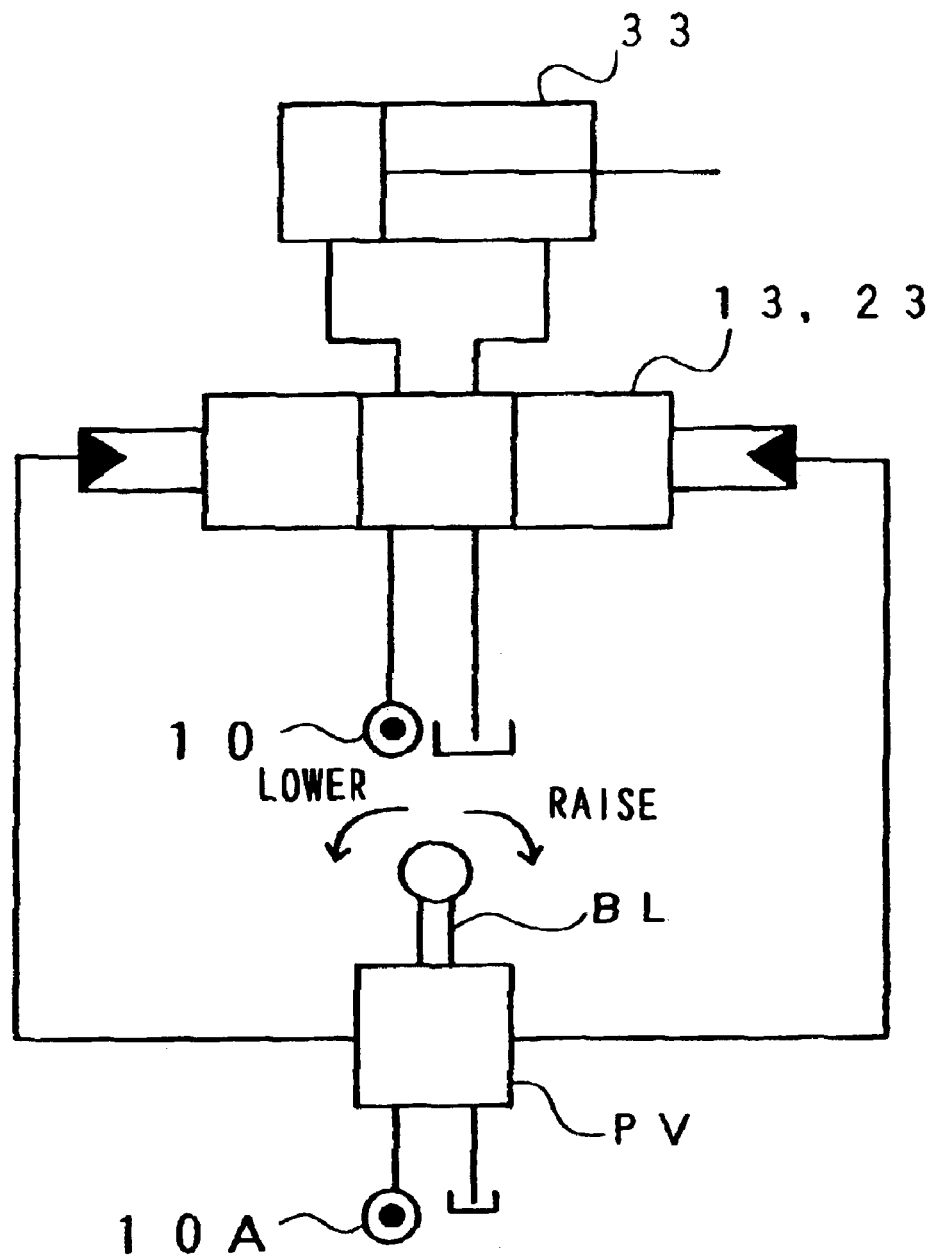
FIG. 4 is a figure showing a boom pilot circuit in a pilot hydraulic circuit for working.

A working attachment for the wheel type hydraulic shovel consists, for example, of a boom, an arm, and a bucket. Pilot operation levers for each of an arm, a boom, and a bucket are provided within the driving compartment of the wheel type hydraulic shovel. As a representative example of a pilot circuit for a working attachment, FIG. 4 shows a boom pilot circuit. When a boom operation lever BL is operated, the pressure of pressurized hydraulic fluid from the pilot pump 10A is reduced by a pressure reduction valve (pilot valve) PV according to the amount of operation of the boom operation lever BL. Control valves 13 and 23 of hydraulic pilot controlled direction control type for the boom (see FIG. 1) are changed over according to the hydraulic pressure from the pilot pump 10A whose pressure has been reduced by the pilot valve PV. Due to this, the hydraulic fluid discharged from the main pump 10 is conducted to a boom cylinder 33 via the control valves 13 and 23, and the boom is raised or lowered by the extension or retraction of the boom cylinder 33. When the boom operation lever BL is operated to the boom raise side, then pressurized hydraulic fluid is supplied to the bottom side of the boom cylinder 33. When the boom operation lever BL is operated to the boom lower side, then pressurized hydraulic fluid is supplied to the rod side of the boom cylinder 33.

With the present invention, the operational state of the accelerator pedal 15 which adjusts the rotation of the propulsion motor 1 which causes the vehicle to be propelled, and the operational state of the operation levers which operate the working attachment, are detected, and the engine rotational speed is controlled according to each of these operational states. In the following, the method for detecting the operational state of the accelerator pedal 15 and the operational state of the operation levers will be explained.

Figure 5:
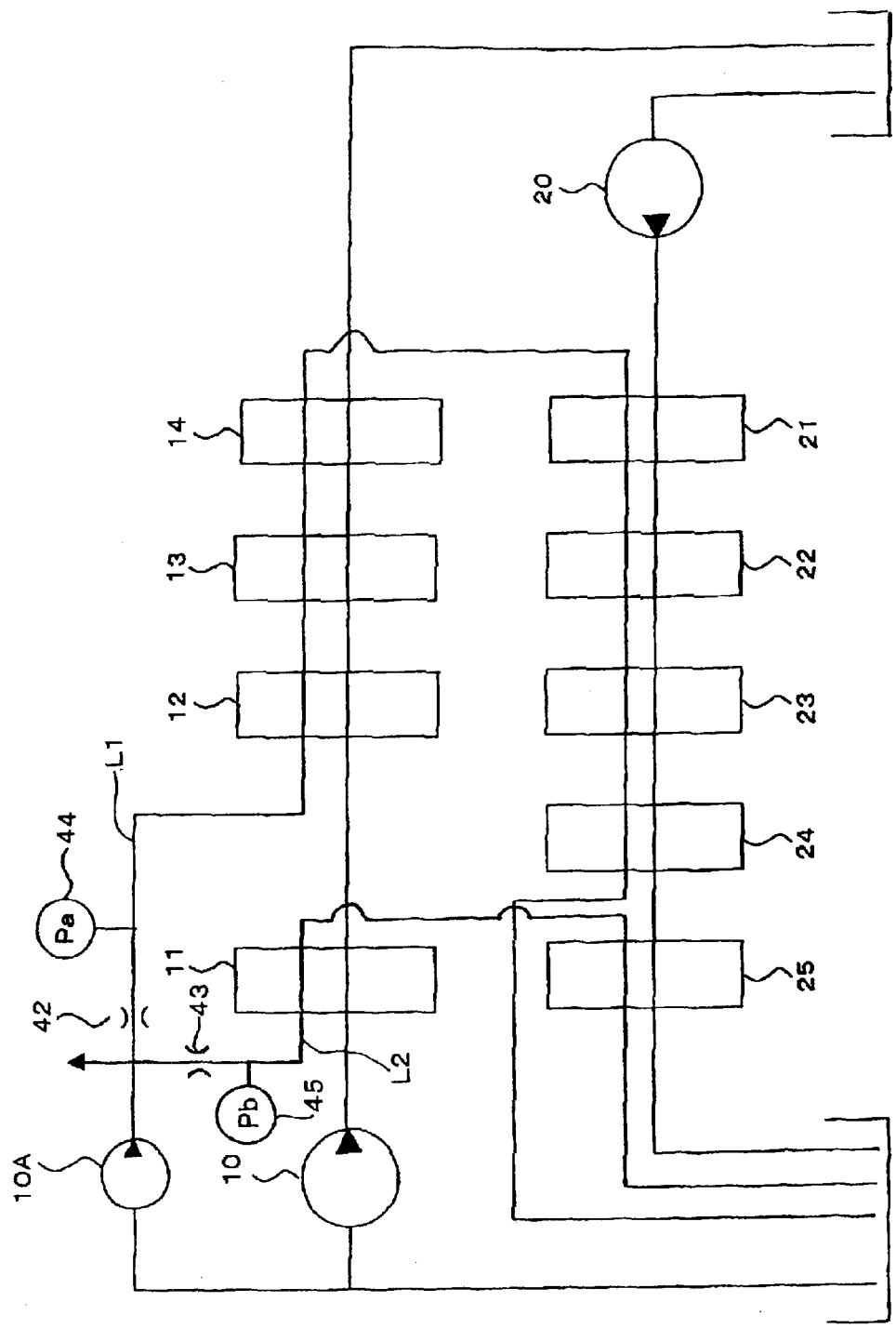
FIG. 5 is a diagram showing a circuit which detects operation/non-operation of an operation lever and operation/non-operation of an accelerator pedal.

FIG. 5 is a figure for explanation of a circuit which detects the operation/non-operation state of the accelerator pedal 15 and the operation/non-operation state of an operation lever. Hydraulic fluid which is discharged from the pilot pump 10A is conducted through a line L1 to a reservoir via the control valve 12 for the bucket, the control valve 13 for the boom, the control valve 14 for the arm, the control valve 21 for swiveling, the control valve 22 for the arm, the control valve 23 for the boom, and the spare control valve 24. Furthermore, the hydraulic fluid which is discharged from the pilot pump 10A is conducted through a line L2 to the reservoir via the control valves 11 and 25 for the propulsion motor.

Restrictors 42 and 43 are provided in the lines L1 and L2 respectively. A pressure switch 44 for working and a pressure switch 45 for vehicle propulsion are provided in the lines L1 and L2 on the downstream sides of the restrictors 42 and 43, respectively. When any one of the control valves 12 through 14 and 21 through 24 is operated, the line L1 is interrupted, and the hydraulic pressure in the line L1 on the downstream side of the restrictor 42 rises. Due to this, the pressure switch 44 for working is turned ON, and the operation of control valves 12 through 14 and 21 through 24, in other words of operation levers, is detected. In the same manner, when the control valve 11 or 25 is operated, the line L2 is interrupted, and the hydraulic pressure in the line L2 on the downstream side of the restictor 43 rises. Accordingly, the pressure switch 45 for working is turned ON, and the operation of the control valve 11 or 25, in other words of the accelerator pedal, is detected.

Figure 6:
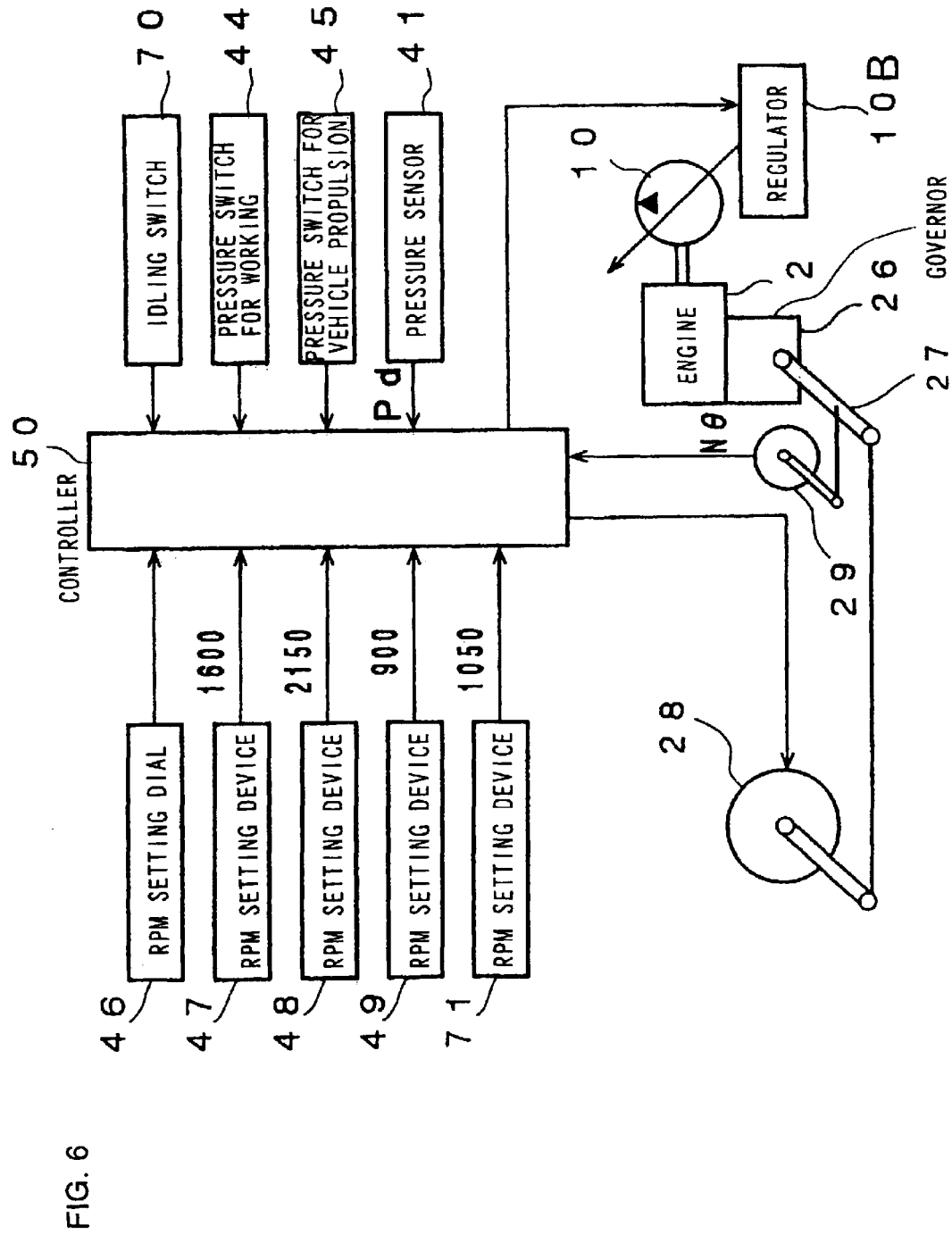
FIG. 6 is a block diagram of a control circuit which controls engine rotational speed.

Next, a control circuit will be explained, which controls the engine rotational speed corresponding to the operational state of the accelerator pedal 15 and the operational state of the operation levers, which are detected as described above. FIG. 6 is a block diagram of the control circuit which controls engine rotational speed. Various devices are controlled by a controller 50 which is made up of a CPU and the like.

A governor 26 of the engine 2 is connected to a pulse motor 28 via a link mechanism 27, and the engine rotational speed is controlled by the rotation of this pulse motor 28. In other words, the engine rotational speed is increased by forward rotation of the pulse motor 28, and the engine rotational speed is decreased by reverse rotation of the pulse motor 28. The rotation of this pulse motor 28 is controlled by a control signal from the controller 50. A potentiometer 29 is connected to the governor 26 by the link mechanism 27. The potentiometer 29 detects the governor lever angle which corresponds to the rotational speed of the engine 2. The governor lever angle which has been detected is inputted to the controller 50 as the engine control rotational speed $N\theta$.

Furthermore, to the controller 50 there are connected a rotational speed setting dial 46 which sets the engine rotational speed through operation from the driving compartment, an idling switch 70 which commands idling rotational speed control, the pressure sensor 41 shown in FIG. 1, the pressure switch 44 for working shown in FIG. 5, the pressure switch 45 for vehicle propulsion, a rotational speed setting unit 47 which sets the maximum rotational speed of 1600 rpm during vehicle propulsion described above, a rotational speed setting unit 48 which sets the maximum rotational speed of 2150 rpm during high horsepower vehicle propulsion described above, a rotational speed setting unit 49 which sets a predetermined minimum rotational speed (for example 900 rpm), and a rotational speed setting unit 71 which sets a predetermined idling rotational speed (for example 1050 rpm). It should be understood that the rotational speed is set in the range from 900 rpm to 1950 rpm by the rotational speed setting dial 46. Furthermore, the idling rotational speed for vehicle propulsion and the idling rotational speed for working are both set to the same value (1050 rpm).

Figure 7:
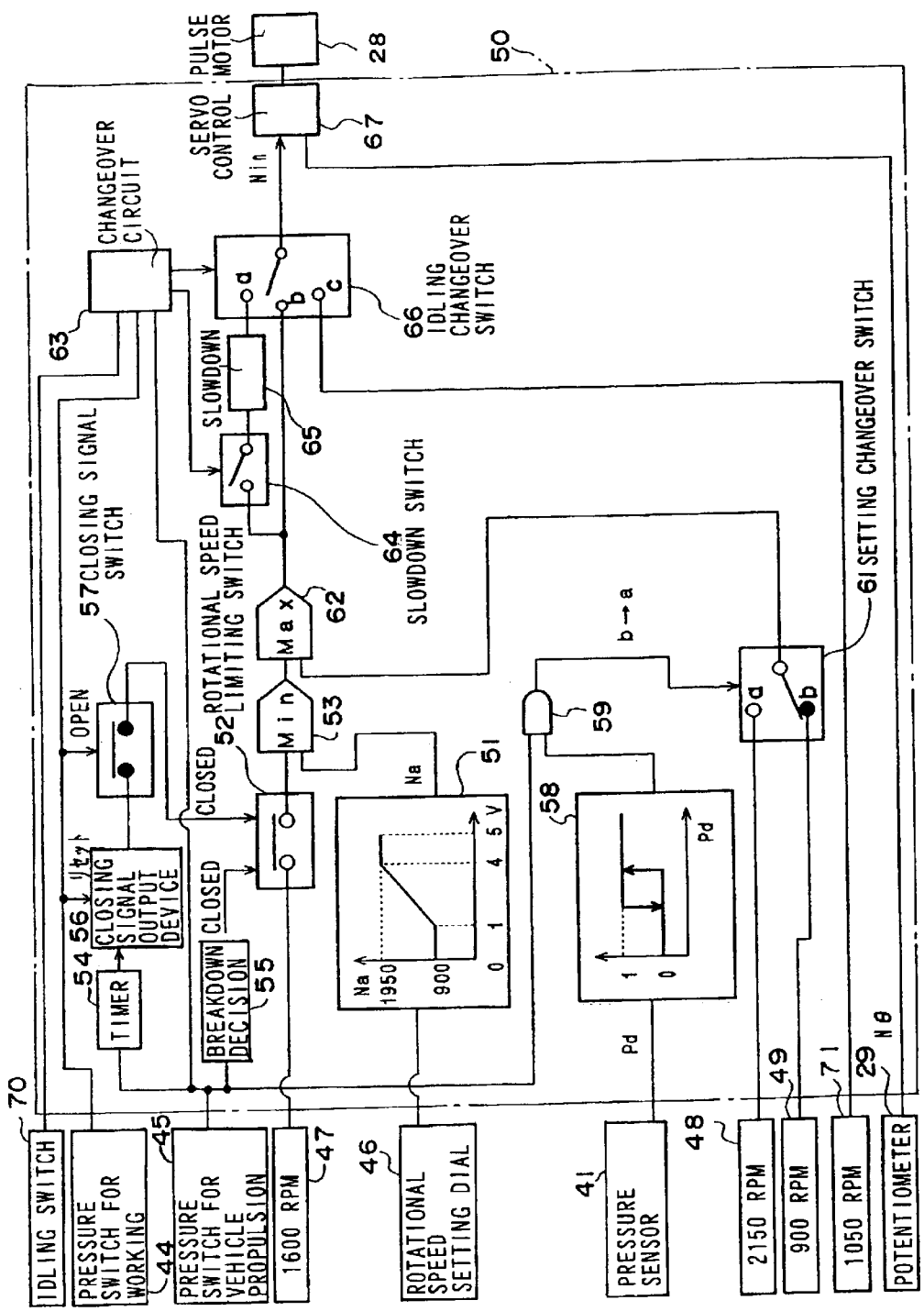
FIG. 7 is a diagram explaining the details of the control circuit shown in FIG. 6.

FIG. 7 is an outline figure for explanation of the details of the engine rotational speed control by the controller 50. A function generator 51 outputs a target rotational speed Na (a dial rotational speed) which corresponds to a signal V from the rotational speed setting dial (potentiometer) 46 according to a characteristic which is determined in advance and shown in the figure. The target rotational speed Na is inputted to a minimum value selection circuit 53. When a rotational speed limiting switch 52 is closed, the predetermined rotational speed of 1600 rpm which has been set upon the rotational speed setting unit 47 is inputted to the minimum value selection circuit 53. In the minimum value selection circuit 53, the predetermined rotational speed of 1600 rpm and the dial rotational speed Na are compared together, and the minimum value of these two inputs is selected. A rotational speed limiting switch 52 is closed by a closing signal as described hereinafter.

The ON/OFF signal from the pressure switch 45 for vehicle propulsion is inputted both to a timer 54 and a breakdown decision circuit 55. The timer 54 outputs a specified signal to a closing signal output device 56 when a predetermined time period t0 (for example, 2 seconds) has been elapsed. The closing signal output device 56 outputs a closing signal according to the signal from a timer 54 so as to close the rotational speed limiting switch 52 via a closing signal switch 57. After the predetermined time period t0 has been timed by the timer 54, and until a reset signal is inputted, the closing signal output device 56 outputs a closing signal continuously, without any dependence upon the state of the timer 54. The timer 54 is reset by an OFF signal from the pressure switch 45 for vehicle propulsion, or by the timing of a predetermined time period t0 of the ON signal.

The ON/OFF signal from the pressure switch 44 for working is inputted to the closing signal output device 56 and to the closing signal switch 57. The closing signal output device 56 stops outputting the closing signal when an ON signal (a reset signal) is inputted from the pressure switch 44 for working. The closing signal switch 57 is opened by an ON signal from the pressure switch 44 for working, and is closed by an OFF signal therefrom.

The breakdown decision circuit 55 decides upon breakdown of the pressure switch 45 for vehicle propulsion. The pressure switch 45 for vehicle propulsion is adjusted so as, when normal, to output 0.5 V (the OFF signal) or 4.5 V (the ON signal) corresponding to an input of 5 V. The breakdown decision circuit 55 outputs a closing signal to the rotational speed limiting switch 52 when the pressure switch 45 for vehicle propulsion outputs an abnormal signal. It should be understood that, when the pressure switch 45 for vehicle propulsion outputs 5 V, the breakdown decision circuit 55 determines that the switch 45 has gone open circuit, while when the switch 45 outputs 0 V the circuit 55 determines that the switch 45 has been caused a short circuit. In this manner, the rotational speed limiting switch 52 is closed when the pressure switch 45 for vehicle propulsion breaks down.

The pressure sensor 41 which detects the motor drive hydraulic pressure is connected to the function generator 58. The function generator 58 outputs a high level signal when the detection signal from the pressure sensor 41 is a predetermined value (for example, the changeover pressure P1 for the motor displacement amount qm) or greater, and outputs a low level signal when it is less than the predetermined value.

An AND gate 59 is connected with the pressure switch 45 for vehicle propulsion and the function generator 58. The AND gate 59 outputs a changeover signal to a setting changeover switch 61 when the pressure switch 45 for vehicle propulsion is ON, in other words 4.5 V is inputted from the pressure switch 45 for vehicle propulsion, and also a high level signal is outputted from the function generator 58. The setting changeover switch 61 changes over from the contact b to the contact a according to the changeover signal from the AND gate 59. The rotational speed units 48 and 49 are connected to the contacts a and b of the setting changeover switch 61, respectively. When the setting changeover switch 61 is changed over to the contact a, the set rotational speed of 2150 rpm of the rotational speed setting unit 48 is inputted to the maximum value selection circuit 62. When the setting changeover switch 61 is changed over to the contact b, the set rotational speed of 900 rpm of the rotational speed setting unit 49 is inputted to the maximum value selection circuit 62.

In the maximum value selection circuit 62, the set rotational speed of 2150 rpm or of 900 rpm and the rotational speed which has been selected by the minimum value selection circuit 53 are compared together, and the maximum value thereof is selected.

The ON/OFF signal from the idling switch 70, the ON/OFF signal from the pressure switch 44 for working, and the ON/OFF signal from the pressure switch 45 for vehicle propulsion are each inputted to the changeover circuit 63. A procedure which will be explained hereinafter is executed in the changeover circuit 63 so that an open/close signal is outputted to a slowdown switch 64, and at the same time, a changeover signal is outputted to an idling changeover switch 66. The contact a, the contact b, and the contact c of the idling changeover switch 66 are respectively connected to a slowdown control section 65, the maximum value selection circuit 62, and the rotational speed setting unit 71 which sets the idling rotational speed.

The slowdown control section 65 performs a predetermined slowdown control when the slowdown switch 64 goes ON, and resets the slowdown control when it goes OFF. The slowdown control is a control which lowers the engine rotational speed slowly to a predetermined idling rotational speed of 1050 rpm.

The change of engine rotational speed according to slowdown control is shown in FIGS. 8A and 8B. The horizontal axis in FIGS. 8A and 8B shows the time t, while the vertical axis shows the engine rotational speed. As shown in FIG. 8A, when the slowdown switch 64 is turned ON, the engine rotational speed (for example 1950 rpm or 1600 rpm) is lowered to the idling rotational speed of 1050 rpm at a constant rate (the slope of the straight lines). It should be understood that, as shown in FIG. 8B, the time period for reducing the engine rotational speed to the idling rotational speed may also be constant without any dependence upon the engine rotational speed. As will be described hereinafter, the above described slowdown control is performed when the accelerator pedal 15 has released while no operation lever is being operated, but it is not performed when the operation lever is released while the accelerator pedal 15 is not being operated.

Figure 9:
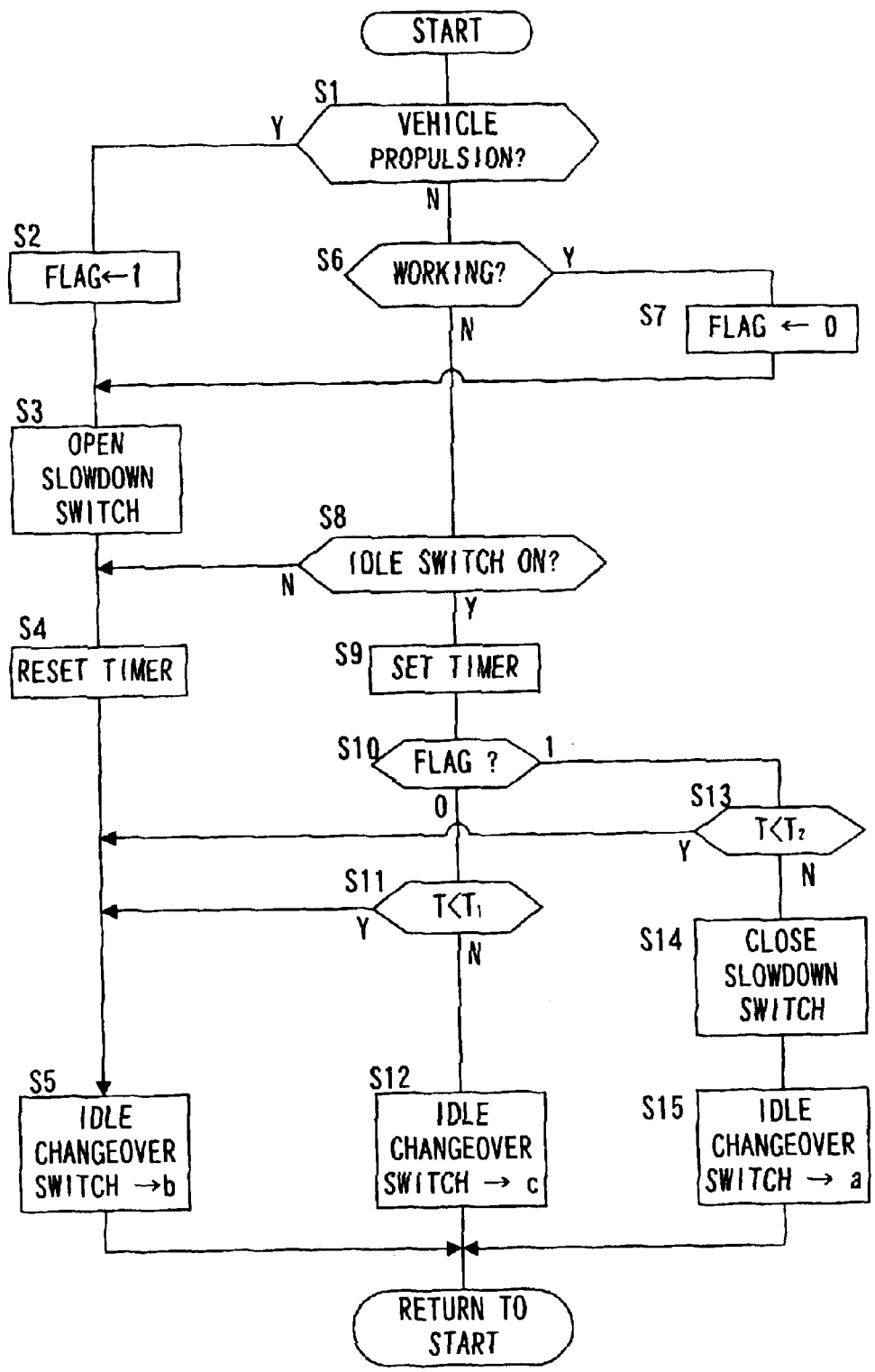
FIG. 9 is a flow chart showing the processing sequence of an idling control program for a changeover circuit.

FIG. 9 is a flow chart for explanation of the procedure performed by the above described changeover circuit 63. In the following, the procedure for signal changeover performed by the changeover circuit 63 will be explained using the flow chart of FIG. 9.

In a step S1 a decision is made as to whether the vehicle is in the propulsion state or not, according to the signal from the pressure switch 45 for vehicle propulsion. When an ON signal is outputted from the pressure switch 45 for vehicle propulsion, then it is judged that the vehicle is in the propulsion state, and the flow of control proceeds to a step S2 in which a flag is set to 1. Next, in a step S3, an open signal is outputted to the slowdown switch 64. In a step S4, a changeover timer not shown in the figures is reset. In a step S5, a signal is output to change over the idling changeover switch 66 to its contact b, and then the flow of control returns.

On the other hand, when an OFF signal is outputted from the pressure switch 45 for vehicle propulsion, then the negative judgement is made in the step S1, and the flow of control proceeds to a step S6. In the step S6, a decision is made according to the signal from the pressure switch 44 for working as to whether or not the vehicle is in the working state. If an ON signal is being outputted from the pressure switch 44 for working and it is judged that the vehicle is in the working state, then the flow of control proceeds to a step S7. The flag is set to 0 in the step S7, and the flow of control proceeds to the step S3.

If an OFF signal is outputted from the pressure switch 44 for working, then the negative judgement is made in the step S6, and the flow of control proceeds to a step S8. In the step S8, a decision is made as to whether the idling switch 70 is ON or not. If in the step S8 an affirmative judgement is made that the idling switch 70 is ON, then the flow of control proceeds to a step S9, while if a negative judgement is made, then the flow of control proceeds to the step S4. In the step S9 the changeover timer is set. It should be understood that, when the changeover timer is once set, it continues to measure time until it is reset in the step S4.

Next, in a step S10 the value of the flag is judged. If the flag is 0, in other words, the vehicle has been in the working state, then the flow of control proceeds to a step S11. In the step S11 a decision is made as to whether or not the changeover timer has timed a predetermined time period T1 (for example, 3.5 seconds). If in the step S11 it is judged that the changeover timer has timed the predetermined time period T1, then the flow of control proceeds to a step S12. In the step S12 a signal is outputted to change over the idling changeover switch 66 to its contact c, and then the flow of control returns. On the other hand, if in the step S11 it is judged that the time period timed by the changeover timer is less than the predetermined time period T1, then the flow of control proceeds to the step S5.

In the step S10, when the flag is 1, in other words, when the vehicle has been in the propulsion state, the flow of control proceeds to a step S13. In the step S13 a decision is made as to whether or not the changeover timer has measured a predetermined time period T2 (for example, 5 seconds). If, in the step S13, it is judged that the changeover timer has timed the predetermined time period T2, the flow of control proceeds to a step S14. In the step S14 a close signal is outputted to the slowdown switch 64. Next, in a step S15, a signal is outputted to change over the idling changeover switch 66 to its contact a, and then the flow of control returns. On the other hand, if, in the step S13, it is judged that the time period measured by the changeover timer is less than the predetermined time period T2, then the flow of control proceeds to the step S5.

As has been explained above using the flow chart of FIG. 9, changeover control of the slowdown switch 64 and of the idling changeover switch 66 is executed by the changeover circuit 63, based upon the signals from the idling switch 70, the pressure switch 44 for working, and the pressure switch 45 for vehicle propulsion. According to the procedure executed by the changeover circuit 63 shown in FIG. 9, when the idling changeover switch 66 is changed over to its contact a, the rotational speed from the slowdown control section 65 is inputted to a servo control section 67 as a rotational speed command value Nin. When the idling changeover switch 66 is changed over to its contact b, the rotational speed which has been selected by the maximum value selection circuit 62 is inputted to the servo control section 67 as the rotational speed command value Nin. And, when the idling changeover switch 66 is changed over to its contact c, the rotational speed which has been set in the rotational speed setting unit 71 which sets idling rotational speed is inputted to the servo control section 67 as the rotational speed command value Nin.

Figure 10:
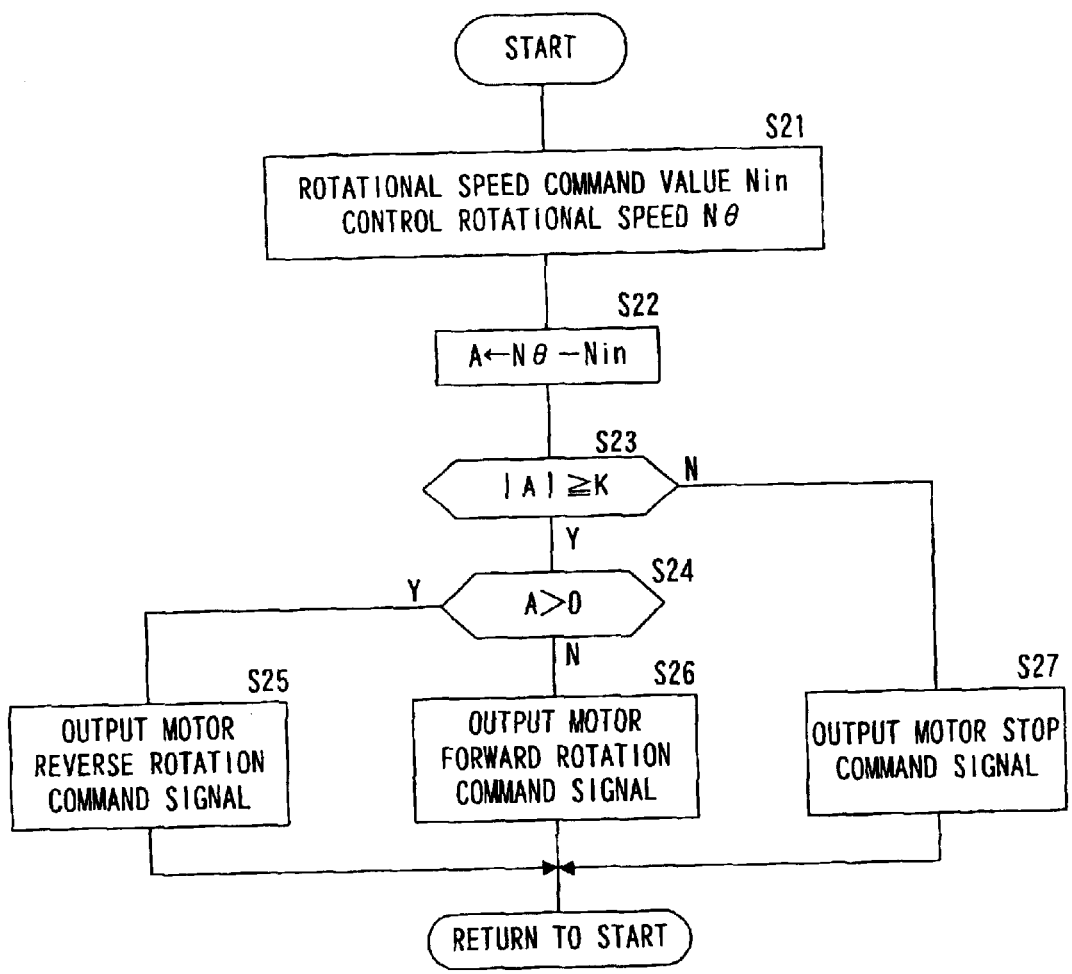
FIG. 10 is a flow chart showing the processing sequence of a control program for engine rotational speed for a controller.

The servo control section 67 compares together the rotational speed command value Nin which has been inputted, and the control rotational speed Nθ which corresponds to the amount of displacement of the governor lever 27 which has been detected by the potentiometer 29. And the servo control section 67 controls the pulse motor 28 so as to make the rotational speed command value Nin and the control rotational speed Nθ agree with one another. FIG. 10 shows the procedure for control of the pulse motor 28 executed by the servo control section 67.

In a step S21, the rotational speed command value Nin and the control rotational speed Nθ are both read in. In a step S22, the rotational speed command value Nin is subtracted from the control rotational speed Nθ (Nθ−Nin). The result is stored in a memory not shown in the figures as a rotational speed difference A. In a step S23 a decision is made as to whether or not $|A| \geq K$, using a standard rotational speed difference K which is set in advance. If in the step S23 an affirmative judgement is made that $|A| \geq K$, then the flow of control proceeds to a step S24. In the step S24, a decision is made as to whether or not the rotational speed difference A>0.

If in the step S24 an affirmative judgment is made that A>0, then it is the case that the control rotational speed Nθ is greater than the rotational speed command value Nin. In this case the flow of control proceeds to a step S25, and a signal is outputted to the pulse motor 28 which commands reverse rotation of that motor in order to reduce the rotational speed of the engine. By doing this the pulse motor 28 is rotated in reverse, and the rotational speed of the engine 2 is reduced.

On the other hand, if in the step S24 a decision is made that $A \leq 0$, then it is the case that the control rotational speed Nθ is smaller than the rotational speed command value Nin. In this case, the flow of control proceeds to a step S26, and a signal is outputted to the pulse motor 28 which commands forward rotation of that motor in order to increase the rotational speed of the engine. By doing this the pulse motor 28 is rotated forwards, and the rotational speed of the engine 2 is increased.

If in the step S23 a negative judgement is made, then the flow of control proceeds to a step S27, in which a motor stop signal is outputted to the pulse motor 28. By doing this, the rotational speed of the engine 2 is maintained at a constant value. When any one of the steps S25 through S27 have been executed, then the flow of control returns to the start.

In the above the structure of the hydraulically powered vehicle according to the present invention has been explained. FIGS. 11 through 14 are time charts showing the relationships between the engine rotational speed, the pressure switches, the pressure sensors and so on. In the following, the operation of the hydraulically powered vehicle under various conditions is explained using the time charts of FIGS. 11 through 14.

Figure 12:
FIGS. 12A–12C are time charts explaining the operation of the control circuit.
Figure 14:
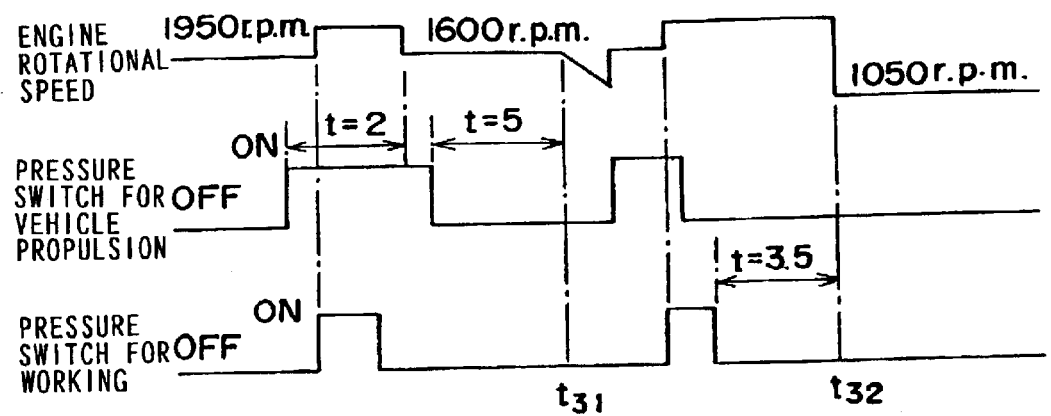
FIG. 14 is a time chart explaining the operation of the control circuit.

It should be noted that FIGS. 11 and 12 are time charts for the case in which the idling switch 70 is OFF. In this case, the engine rotational speed is controlled between the maximum rotational speed of 2150 rpm for high horsepower vehicle propulsion, and the minimum rotational speed of 900 rpm. FIGS. 13 and 14 are time charts for the case in which the idling switch 70 is ON.

(1) Idling switch 70 OFF, detection signal Pd<P1, dial rotational speed Na=1950 rpm.

FIGS. 11A through 11C are time charts showing the relationships between the pressure switch 44 for working, the pressure switch 45 for vehicle propulsion, and the engine rotational speed in the above described circumstances.

When the detection signal Pd of the pressure sensor 41 is less than P1 (Pd<P1), the function generator 58 outputs low level, and the setting changeover switch 61 is changed over to its contact b. And the set rotational speed of 900 rpm of the rotational speed setting unit 49 is inputted to the maximum value setting circuit 62. The dial rotational speed Na=1950 rpm of the rotational speed setting dial 46 is inputted to the minimum value selection circuit 53. Furthermore, when the idling switch 70 is OFF, the idling changeover switch 66 is always changed over to its contact b by the processing of the changeover circuit 63 as previously described (the step S5 of FIG. 9).

When no operation lever is being operated and also the accelerator pedal 15 is not being operated, both the pressure switch 44 for working and the pressure switch 45 for vehicle propulsion output OFF signals. Due to this, the rotational speed limiting switch 52 is opened, and the dial rotational speed Na=1950 rpm is selected by the minimum value setting circuit 53 and the maximum value setting circuit 62. The selected dial rotational speed Na is inputted to the servo control section 67 as a rotational speed command value Nin. The pulse motor 28 is controlled by the servo control section 67 so as to make the control rotational speed Nθ which corresponds to the value detected by the potentiometer 29 and the rotational speed command value Nin=1950 rpm agree with one another. Due to this, the engine rotational speed is controlled to the dial rotational speed Na=1950 rpm.

Vehicle propulsion is started from the above-described state by stepping upon the accelerator pedal 15. The pressure switch 45 for vehicle propulsion outputs an ON signal, and the timer 54 starts. When a predetermined time period t0 (=2) has elapsed after the timer 54 has started; the closing signal output device 56 outputs a closing signal. The closing signal switch 57 is closed by the OFF signal from the pressure switch 44 for working. Due to this, the rotational speed limiting switch 52 is closed by the closing signal from the closing signal output device 56. The set rotational speed of 1600 rpm of the rotational speed setting unit 47 is inputted to the minimum value setting circuit 53. The set rotational speed of 1600 rpm is selected by the minimum value setting circuit 53 and by the maximum value selection circuit 62. Since the idling changeover switch 66 is at its contact b, the engine rotational speed is controlled to the set rotational speed of 1600 rpm by the servo control section 67. As a result, the pump output amount is limited, and excessively high rotational speed of the propulsion motor 1 is prevented (t1 of FIG. 11A).

Thereafter, when the operation of the accelerator pedal 15 is stopped, the timer 54 is reset (t2). However, the closing signal output device 56 continues to output a closing signal, and the engine rotational speed is kept at the set rotational speed of 1600 rpm. Due to this, the engine rotational speed is kept restrained as before even if the operation of the accelerator pedal 15 is stopped, for example, to wait for a green light, so that deterioration of fuel consumption is prevented.

When from this state (t2) an operation lever is operated, along with the pressure switch 44 for working outputting an ON signal and the closing signal output device 56 being reset and stopping its output of the closing signal, the closing signal switch 57 is opened (t3). As a result the rotational speed limiting switch 52 is opened, and a dial rotational speed Na=1950 rpm is selected by the minimum value selection speed 53. Due to this, the engine rotational speed is controlled to the dial rotational speed Na=1950 rpm. By doing this, the engine rotational speed is instantly controlled to the dial rotational speed Na=1950 rpm by the operation of the operation lever, and the working characteristic is enhanced.

Thereafter, when the operation of the operation lever is stopped, the pressure switch 44 for working outputs an OFF signal, and closes the closing signal switch 57 (t4). At this time the pressure switch 45 for vehicle propulsion does not output an ON signal so that the closing signal output device 56 does not output a closing signal. The rotational speed limiting switch 52 is opened, and the engine rotational speed remains at the dial rotational speed Na=1950 rpm. Due to this, even if the operation lever is repeatedly and intermittently operated, the engine rotational speed is maintained at the dial rotational speed Na=1950 rpm, and frequent changing of the rotational speed is prevented.

As shown in FIG. 11B, when an operation lever is operated during vehicle propulsion in the state (t5) in which the engine rotational speed has been controlled to the set rotational speed 1600 rpm, the closing signal switch 57 is opened (t6) by the ON signal from the pressure switch 44 for working. Accordingly, the rotational speed limiting switch 52 is opened, and the engine rotational speed is controlled to the dial rotational speed Na=1950 rpm.

While the vehicle is in the propulsion state, an operation lever is operated and the engine rotational speed is brought to the dial rotational speed Na=1950 rpm (t7), thereafter, the operation of the operation is stopped lever during vehicle propulsion. When the timer 54 which times the ON signal of the pressure switch 45 for vehicle propulsion has measured the predetermined time period t0 (=2) (t8) in the state in which the operation of the operation lever is stopped and the pressure switch 44 for working has gone OFF, the closing signal output device 56 outputs a closing signal. Therefore, the rotational speed limiting switch 52 is closed, and the engine rotational speed is controlled to the set rotational speed of 1600 rpm. Because of this, during vehicle propulsion, the engine rotational speed is changed to the set rotational speed of 1600 rpm, even though the predetermined time period t0 has not yet elapsed since the operation lever was stopped.

As shown in FIG. 11C, in the state in which, while working, the engine rotational speed has been controlled to the dial rotational speed Na=1950 rpm, the predetermined time period t0 (=2) for which the accelerator pedal 15 is operated has been measured by the timer 54 (t9). Thereafter, when the operation of the operation lever is stopped, the pressure switch 44 for working goes OFF, and the closing signal output device 56 instantly outputs a closing signal (t10). The rotational speed limiting switch 52 is closed, and the engine rotational speed is controlled to the set rotational speed of 1600 rpm. Therefore, the vehicle may travel directly after the cessation of working while restraining the engine rotational speed.

(2) Idling switch 70 OFF, and detection signal Pd<P1.

FIGS. 12A and 12B are time charts showing the relationships between the engine rotational speed, the pressure switch 44 for working, the pressure switch 45 for vehicle propulsion, and the set value of the rotational speed setting dial 46 (the dial rotational speed) in the above described circumstances.

As shown in FIG. 12A, the dial rotational speed is set to a speed (for example 1000 rpm) below the set rotational speed of 1600 rpm which has been set by the rotational speed setting unit 47. The dial rotational speed is selected by the minimum value selection circuit 53 without any dependence upon the operation of the accelerator pedal 15, in other words without any dependence upon whether the rotational speed limiting switch 52 is opened or closed. The idling changeover switch 66 is changed over to its contact b. Due to this, the engine rotational speed is controlled according to the dial rotational speed so that, for instance, very slow speed propulsion of the vehicle may be easily performed.

As shown in FIG. 12B, the dial rotational speed is set to a maximum value of 1950 rpm. When the accelerator pedal 15 is operated for more than the predetermined time period t0 (=2), the engine rotational speed is controlled to the set rotational speed of 1600 rpm of the rotational speed setting unit 47 (t11). Thereafter, when the dial rotational speed is set to a speed (for example 1000 rpm) below the set rotational speed of 1600 rpm (t12), the engine rotational speed is controlled to this dial rotational speed of 1000 rpm. Thereafter, if the dial rotation speed is set to the maximum value of 1950 rpm (t13), the engine rotational speed is controlled to the set rotational speed of 1600 rpm. Due to this, during vehicle propulsion, the engine rotatioinal speed is kept substantially below the set rotational speed of 1600 rpm, and excessively high rotational speed of the propulsion motor 1 is prevented.

(3) Idling switch 70 OFF, pressure switch 44 for working OFF.

FIG. 12C is a time chart showing the relationships between the engine rotational speed, the value Pd detected by the pressure sensor 41, the set value of the rotational speed setting dial 46, and the pressure switch 45 for vehicle propulsion in the above described circumstances.

During vehicle propulsion, when the motor drive pressure is increased and the detection value of the pressure sensor 41 becomes above the predetermined value P1 (t14), the function generator 58 outputs a high level signal. The AND gate 59 changes over the setting changeover switch 61 to its contact a, based upon the ON signal of the pressure switch 45 for vehicle propulsion and the high level signal of the function generator 58. Due to this, the set rotational speed of 2150 rpm of the rotational speed setting unit 48 is inputted to the maximum value setting circuit 62. The set rotational speed of 2150 rpm is selected by the maximum value setting circuit 62, and the engine rotational speed is controlled to the set rotational speed of 2150 rpm. Due to this, high horsepower vehicle propulsion becomes possible, and vehicle propulsion is performed smoothly without any insufficiency of output, even in situations in which the motor drive torque becomes great such as when starting the vehicle moving or the like.

Thereafter, when the motor drive torque diminishes and the detection value Pd of the pressure sensor 41 becomes the predetermined value P1 or lower (t15), the function generator 58 outputs a low-level signal. Due to this, the setting changeover switch 61 is changed over to its contact b. The set rotational speed of 900 rpm of the rotational speed setting unit 49 is inputted to the maximum value setting circuit 62. In the maximum value setting circuit 52, the set rotational speed of 1600 rpm of the rotational speed setting unit 47 is selected, and the engine rotational speed is controlled to the set rotational speed of 1600 rpm. As a result, during vehicle propulsion requiring low power, the engine rotational speed is reduced down to the set rotational speed of 1600 rpm (or to the dial rotational speed, when this dial rotational speed is less than 1600 rpm). Thus the engine rotational speed is most suitably controlled according to the load as has been described above using FIG. 12C.

(4) Idling switch 70 On, detection signal Pd<P1, dial rotational speed Na=1950 rpm.

In the following, the case of performing idling control of the engine rotational speed with the idling switch 70 ON will be explained using FIG. 13. It should be understood that the point of difference from the operation in the above described cases (1) through (3) is that, along with the idling switch 70 being ON, the accelerator pedal 15 and the operation levers are all in the non-operating state. Thus, this explanation will focus upon the points of difference from the above cases (1) through (3) with regard to the behavior of engine rotational speed when the idling switch 70 is ON and moreover the accelerator pedal 15 and the operation levers are not being operated.

FIGS. 13 and 14 are time charts showing the relationships between the pressure switch 44 for working, the pressure switch 45 for vehicle propulsion, and the engine rotational speed in the above described circumstances. It should be understood that in FIG. 13A the pressure switch 45 for vehicle propulsion is OFF, while in FIGS. 13B and C the pressure switch 44 for working is OFF.

As shown in FIG. 13A, an operation lever is independently operated to start working while the accelerator pedal 15 is not being operated. The idling changeover switch 66 is changed over to its contact b by the procedure (the step S5 of FIG. 9) performed by the changeover circuit 63. Due to this, the engine rotational speed is controlled to the dial rotational speed Na=1950 rpm. When the operation of the operation lever is stopped, the procedure of the steps S8 through S11 of FIG. 9 is performed by the changeover circuit 63. Accordingly, until the predetermined time period T1 (=3.5) has elapsed (t21) since the operation of the operation lever has been stopped, the idling changeover switch 66 remains changed over to its contact b, and the engine rotational speed is maintained at the dial rotational speed Na=1950 rpm. Due to this, it is possible to perform working in the state in which the engine rotational speed is maintained constant, even though the operation lever is repeatedly operated at short intervals.

When the predetermined time period T1 (=3.5) has elapsed (t22) since the operation of the operation lever has been stopped, the flow of control in the changeover circuit 63 proceeds from the step S11 to the step S12, and the idling changeover switch 66 is changed over to its contact c. Due to this, the set rotational speed of 1050 rpm (idling rotational speed) of the rotational speed setting unit 71 is inputted to the servo control section 67. The engine rotational speed is instantly controlled to the idling set rotational speed of 1050 rpm. As a result, along with enhancing the fuel consumption, it is possible to reduce the noise.

When, in the state with the engine rotational speed controlled to the idling rotational speed of 1050 rpm (t23), an operation lever is operated (t24), the idling changeover switch 66 is changed over to its contact b by the processing in the changeover circuit 63 (the step S5 of FIG. 9). Due to this, simultaneously with the operation of the operation lever, the engine rotational speed is controlled to the dial rotational speed Na=1950 rpm, and it is possible to start working instantly.

As shown in FIG. 13B, while no operation lever is being operated, the accelerator pedal 15 alone is operated and propulsion of the vehicle commences (t25). The idling changeover switch 66 is changed over to its contact b by the processing in the changeover circuit 63 (the step S5 of FIG. 9). Due to this, the engine rotational speed is controlled to the dial rotational speed Na=1950 rpm. When, in this state, the timer 54 measures the predetermined time period t0 (=2) (t26), the set rotational speed of 1600 rpm is inputted to the maximum value selection circuit 62 as previously described. The engine rotational speed is controlled to the set rotational speed of 1600 rpm. Thereafter, until the predetermined time period T2 (=5) has elapsed since operation of the accelerator pedal 15 being stopped, the engine rotational speed is maintained at the set rotational speed of 1600 rpm. Due to this, the engine rotational sped is kept constant, even if the accelerator pedal 15 has been released for a short time period to, for instance, wait for a green light, and it is possible instantly to start the vehicle off from rest by operating the pedal.

When the predetermined time period T2 (=5) has elapsed (t27) since the operation of the accelerator pedal 15 being stopped, due to the processing in the changeover circuit 63 (the steps S14 and S15 of FIG. 9), along with the slowdown switch 64 being closed, the idling changeover switch 66 is changed over to its contact a. Due to this, the processing in the slowdown control section 65 commences. The engine rotational speed gradually slows down until it reaches at the idling rotational speed of 1050 rpm as shown in FIG. 8A. As a result the generation of cavitation in the propulsion motor 1 is prevented, and it is possible suitably to reduce the engine rotational speed to the idling rotational speed of 1050 rpm.

In the state in which the engine rotational speed has been controlled to the idling rotational speed of 1050 rpm, the accelerator pedal 15 is operated (t28). Due to the processing in the changeover circuit 63 (the steps S3 through S5 of FIG. 9), the slowdown switch 64 is opened, and also the idling changeover switch 66 is changed over to its contact b. Due to this, the slowdown control is reset, and the engine rotational speed is instantly controlled to the rotational speed before slowdown of 1600 rpm. As a result, the engine generates high horsepower, and it is possible immediately to propel the vehicle.

Furthermore, as shown in FIG. 13C, the slowdown control is reset if the accelerator pedal 15 is operated during slowdown (t29). The engine rotational speed is controlled to 1600 rpm which is the rotational speed controlled before slowdown.

As shown in FIG. 14, in case an operation lever and the accelerator pedal 15 are operated in combination, the operation of the accelerator pedal 15 is terminated after the operation of the operation lever has been terminated. When the predetermined time period T2 (=5) elapses since cessation of operation of the accelerator pedal 15 (t31), the slowdown switch 64 is closed and the idling changeover switch 66 is changed over to its contact a, according to the processing in the changeover circuit 63 (the steps S14 and S15 of FIG. 9). Due to this, the engine rotational speed is slowed down.

Furthermore, conversely, the operation of the operation lever is terminated after the operation of the accelerator pedal 15 has been terminated. When the predetermined time period T1 (=3.5) elapses since the termination of the operation of the operation lever (t32), the idling changeover switch 66 is changed over to its contact c by the processing of the changeover circuit 63 (the step S12 of FIG. 9). Due to this, the engine rotational speed is directly controlled to the idling rotational speed of 1050 rpm.

As has been explained above, according to one embodiment of the present invention, when the operation of the accelerator pedal 15 is terminated while no operation lever is being operated, the engine rotational speed is gradually slowed down to the idling rotational speed of 1050 rpm. On the other hand, when the operation of an operation lever is terminated while the accelerator pedal 15 is not being operated, the engine rotational speed is instantly reduced to the idling rotational speed of 1050 rpm. Due to this, it is possible effectively to economize on fuel and to prevent noise when working is stopped, as well as preventing cavitation from being generated when vehicle propulsion comes to a halt. Furthermore, it is arranged that the engine rotational speed is gradually slowed down after the predetermined time period T2 (=5) has elapsed since the cessation of operation of the accelerator pedal 15. Due to this, the engine rotational speed is maintained constant even if the accelerator pedal 15 has been released to, for instance, wait for a green light, and it is possible to start moving the vehicle instantly. Furthermore, the engine rotational speed is reduced after the predetermined time period T1 (=3.5) has elapsed since the cessation of operation of the operation lever. Due to this, it is possible to perform working with the engine rotational speed maintained constant even when the operation lever is repeatedly operated at short intervals. Moreover, it is possible to perform the idling control in manners which are suitable for each of vehicle propulsion and working, since it is arranged for these predetermined time periods T1 and T2 to be set to mutually differing values, for example with T1<T2.

It should be noted that although, in the above described embodiment, the valve control method has been employed in which the engine rotational speed is constant without any dependence upon operation of the accelerator pedal 15, the accelerator pedal control method may also be used for the present invention, in the same manner. Furthermore, in the above described embodiment, the engine rotational speed during vehicle propulsion was limited to less than or equal to the set rotational speed of 1600 rpm. However, the engine rotational speed may be controlled to the dial rotational speed Na, in the same manner in which the engine rotational speed for working was controlled. Yet further, although it was arranged for the horsepower control to be performed with a hydraulic pump which was of a variable displacement type, it would also be possible for a fixed displacement type to be used.

Although, in the above-described embodiment, a wheel type hydraulic shovel was used, a different type of hydraulically powered vehicle may also be used. Furthermore, although the idling rotational speed when vehicle propulsion is terminated and the idling rotational speed when working is terminated were set to the same value of 1050 rpm, it would also be possible for them to be set to mutually different values.

Moreover although, in the above-described embodiment, it was explained that the maximum rotational speed for vehicle propulsion was 1600 rpm, the rotational speed for vehicle propulsion requiring high power was 2150 rpm, the maximum rotational speed for working was 1950 rpm, and the minimum rotational speed was 900 rpm, they are not limited to these values.

As has been explained above, according to the present invention, if stoppage of operation of the accelerator pedal is detected for a predetermined time period while no operation lever is being operated, the engine rotational speed is gradually reduced to the idling rotational speed for vehicle propulsion. And, if stoppage of operation of an operation lever means is detected for a predetermined time period while the accelerator pedal is not being operated, the engine rotational speed is instantly reduced to the idling rotational speed for working. Therefore, it is possible to economize on fuel and effectively to reduce noise when working is terminated, as well as preventing cavitation from being generated when vehicle propulsion comes to a halt.

What is claimed is:
1. A hydraulically powered vehicle comprising:
   a hydraulic pump which is driven by an engine;
   a hydraulic motor for vehicle propulsion which is driven by pressurized hydraulic fluid discharged from the hydraulic pump;
   at least one hydraulic actuator for working which is driven by pressurized hydraulic fluid discharged from the hydraulic pump;
   an accelerator pedal which adjusts a rotational speed of the hydraulic motor for vehicle propulsion without changing a rotational speed of the engine;
   an operation lever device which operates the hydraulic actuator for working;
   a rotational speed adjustment device which adjusts the rotational speed of the engine; and
   a rotational speed control device which controls the rotational speed adjustment device; wherein
   the rotational speed control device controls the rotational speed adjustment device so that, upon transition from a vehicle propulsion state to a non-propulsion state, the rotational speed of the engine is reduced to an idling rotational speed for vehicle propulsion, and upon transition from a working state to a non-working state, the rotational speed of the engine is reduced to an idling rotational speed for working.

2. A hydraulically powered vehicle according to claim 1, wherein:
   the rotational speed control device controls the rotational speed adjustment device so that, upon transition from the vehicle propulsion state to the non propulsion state, the rotational speed of the engine is gradually reduced to the idling rotational speed for vehicle propulsion, and upon transition from the working state to the non working state, the rotational speed of the engine is instantly reduced to the idling rotational speed for working.

3. A hydraulically powered vehicle comprising:
   a hydraulic pump which is driven by an engine;
   a hydraulic motor for vehicle propulsion which is driven by pressurized hydraulic fluid discharged from the hydraulic pump;
   at least one hydraulic actuator for working which is driven by pressurized hydraulic fluid expelled from the hydraulic pump;
   an accelerator pedal which adjusts a rotational speed of the hydraulic motor for vehicle propulsion;
   an operation lever device which operates the hydraulic actuator for working;
   a state detection device which detects each of a first state in which both the accelerator pedal and the operation lever device are not being operated, a second state in which the accelerator pedal is being operated but the operation lever device is not being operated, and a third state in which the accelerator pedal is not being operated but the operation lever device is being operated;
   a rotational speed adjustment device which adjusts a rotational speed of the engine; and
   a rotational speed control device which controls the rotational speed adjustment device; wherein
   the rotational speed control device controls the rotational speed adjustment device so that, when the first state has been detected for a predetermined time period after transition from the second state to the first state was detected by the state detection device, the rotational speed of the engine is gradually reduced to an idling rotational speed for vehicle propulsion, and when the first state has been detected for a predetermined time period after transition from the third state to the first state was detected, the rotational speed of the engine is instantly reduced to an idling rotational speed for working.

4. A hydraulically powered vehicle according to claim 1, wherein:

the rotational speed control device controls the rotational speed adjustment device so that the rotational speed of the engine becomes constant irrespective of an amount of operation of the accelerator pedal, and also controls an amount of the pressurized hydraulic fluid which is supplied to the hydraulic motor for vehicle propulsion based upon the amount of operation of the accelerator pedal.

5. A hydraulically powered vehicle according to claim 1, further comprising:

an idling switch which commands idling rotational speed control by the rotational speed control device, and wherein the rotational speed control device performs the idling rotational speed control when a command has been outputted by the idling switch.

6. A hydraulically powered vehicle according to claim 5, wherein:

when no command is being outputted by the idling switch, the rotational speed control device controls the rotational speed adjustment device so that the rotational speed of the engine varies between a predetermined maximum rotational speed for vehicle propulsion or a predetermined maximum rotational speed for working, and a predetermined minimum rotational speed, based upon an operational state of the accelerator pedal and an operational state of the operation lever device.

7. A hydraulically powered vehicle according to claim 1, wherein:

the rotational speed adjustment device comprises an operation member which is provided within a driving compartment, and an actuator which adjusts the rotational speed of the engine according to a signal from the rotational speed control device.

8. A hydraulically powered vehicle according to claim 3, wherein:

the predetermined time period for determining to reduce the rotational speed of the engine to the idling rotational speed for vehicle propulsion, is longer than the predetermined time period for determining to reduce the rotational speed of the engine to the idling rotational speed for working.

9. An engine rotational speed control method for a hydraulically powered vehicle which comprises:

a hydraulic pump which is driven by an engine;

a hydraulic motor for vehicle propulsion which is driven by pressurized hydraulic fluid discharged from the hydraulic pump;

at least one hydraulic actuator for working which is driven by pressurized hydraulic fluid discharged from the hydraulic pump;

an accelerator pedal which adjusts a rotational speed of the hydraulic motor for vehicle propulsion without changing a rotational speed of the engine;

an operation lever device which operates the hydraulic actuator for working;

a rotational speed adjustment device which adjusts the rotational speed of the engine; and a rotational speed control device which controls the rotational speed adjustment device; wherein, upon transition from a vehicle propulsion state to a non-propulsion state, the rotational speed of the engine is gradually reduced to an idling rotational speed for vehicle propulsion, and upon transition from a working state to a non-working state, the rotational speed of the engine is instantly reduced to an idling rotational speed for working.

10. A hydraulically powered vehicle according to claim 3, wherein:

the rotational speed control device controls the rotational speed adjustment device so that the rotational speed of the engine becomes constant irrespective of an amount of operation of the accelerator pedal, and also controls an amount of the pressurized hydraulic fluid which is supplied to the hydraulic motor for vehicle propulsion based upon the amount of operation of the accelerator pedal.

11. A hydraulically powered vehicle according to claim 3, further comprising:

an idling switch which commands idling rotational speed control by the rotational speed control device, and wherein the rotational speed control device performs the idling rotational speed control when a command has been outputted by the idling switch.

12. A hydraulically powered vehicle according to claim 11, wherein:

when no command is being outputted by the idling switch, the rotational speed control device controls the rotational speed adjustment device so that the rotational speed of the engine varies between a predetermined maximum rotational speed for vehicle propulsion or a predetermined maximum rotational speed for working, and a predetermined minimum rotational speed, based upon an operational state of the accelerator pedal and an operational state of the operation lever device.

13. A hydraulically powered vehicle according to claim 3, wherein:

the rotational speed adjustment device comprises an operation member which is provided within a driving compartment, and an actuator which adjusts the rotational speed of the engine according to a signal from the rotational speed control device.

* * * * *